(No Model.)
G. E. & R. STEWART.
WAGON END GATE.
No. 525,633. Patented Sept. 4, 1894.
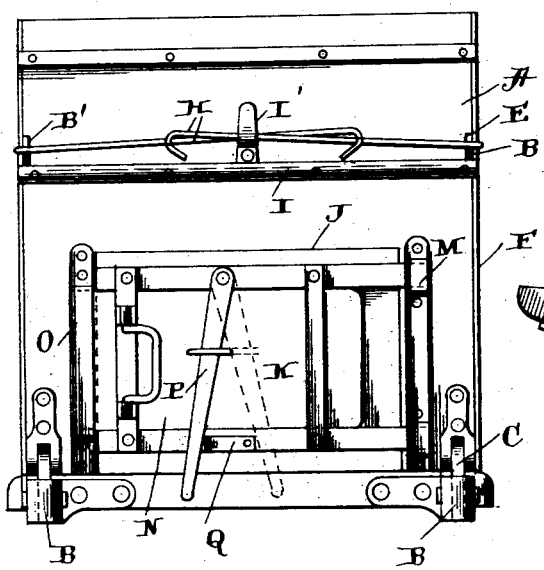
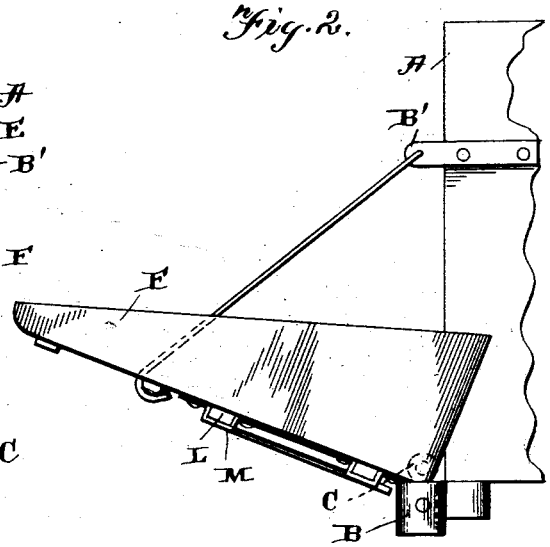
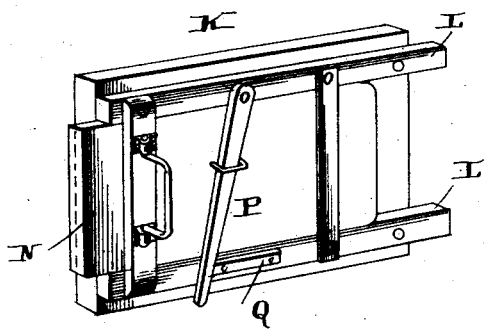
WITNESSES
Geo. E. Fuchs,
Joseph P. Burg
INVENTORS
G. E. Stewart and R. Stewart
By Lehmann Patterson & Wecht, attys.

UNITED STATES PATENT OFFICE.

GEORGE EDWARD STEWART AND RALPH STEWART, OF PHILO, ILLINOIS.

WAGON END-GATE.

SPECIFICATION forming part of Letters Patent No. 525,633, dated September 4, 1894.

Application filed April 3, 1894. Serial No. 506,188. (No model.)

*To all whom it may concern:*

Be it known that we, GEORGE EDWARD STEWART and RALPH STEWART, of Philo, in the county of Champaign and State of Illinois, have invented certain new and useful Improvements in End-Gates; and we do hereby declare the following to be a full, clear, and exact description of the invention, such as will enable others skilled in the art to which it pertains to make and use it, reference being had to the accompanying drawings, which form part of this specification.

Our invention relates to an improvement in end gates; and the object of the same is to construct an improved gate which may be used as a scoop board; and a further object is to provide an improved means for holding the same closed or in an operative position.

The invention consists in the novel features of construction hereinafter fully described and claimed, and illustrated in the accompanying drawings, in which—

Figure 1 is an end view of the gate when closed. Fig. 2 is a side elevation of the same when opened or lowered. Fig. 3 is a detail view of the gate and removable door.

A is the box having the loops B on its rear end in which are removably secured the standards C to which the gate D is hinged. The gate is provided with the side openings E near its upper end while on its edges are the guards F. Projected from the sides of the body are the ears B' which extend through the openings E when the gate is closed, and secured to the ears are the hooked rods H which serve to hold the gate in the position shown in Fig. 2. A rounded cleat I on the gate serves as a hold for the hooks. When the gate is closed these rods are turned inward and rested in the hook or keeper I' as shown in Fig. 1, and in this way the gate is locked in its closed position. When turned down to the position shown in Fig. 2 the gate serves as a scoop board when grain or other commodities are to be shoveled from the body.

The gate is formed with an opening J for the removal or insertion of small articles and the same is closed by the removable door K. The latter at one end is provided with the projecting cleats L which engage keepers M, while a longitudinally movable latch N on the door engages the keeper O at the opposite end, and in this manner the door is held in place. The latch is operated by a lever P pivoted at its upper end to the door and extended through a staple on the latch. Stop Q serves to hold the lower free end of the lever in the desired position.

Having thus fully described our invention, what we claim as new, and desire to secure by Letters Patent, is—

The combination of an end gate having an opening therein, a removable door for closing the opening, cleats projected from one end thereof and keepers on the gate which the said cleats enter, a keeper at the opposite end of the opening, and a movable latch on the door which is adapted to be adjusted in said keeper, substantially as shown and described.

In testimony whereof we affix our signatures in presence of two witnesses.

GEORGE EDWARD STEWART.
  RALPH STEWART.

Witnesses:
  W. D. POWERS,
  J. S. WOODCOCK.